May 28, 1940.　　　　G. T. JACOCKS　　　　2,202,491
RETURN BEND
Filed Oct. 9, 1937　　　　3 Sheets-Sheet 1

INVENTOR.
George T. Jacocks
BY Nathaniel Ely
ATTORNEY

May 28, 1940.                G. T. JACOCKS                2,202,491
                               RETURN BEND
                          Filed Oct. 9, 1937            3 Sheets-Sheet 2
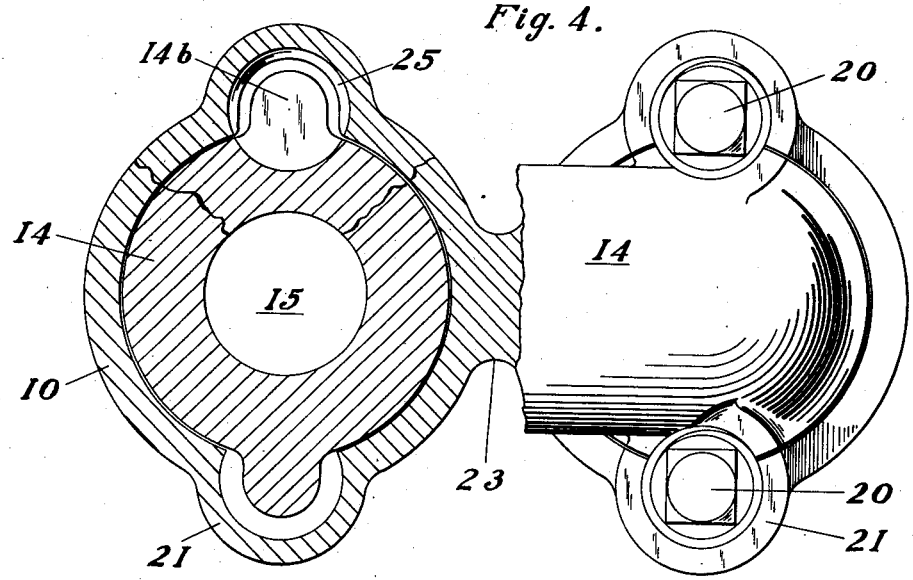
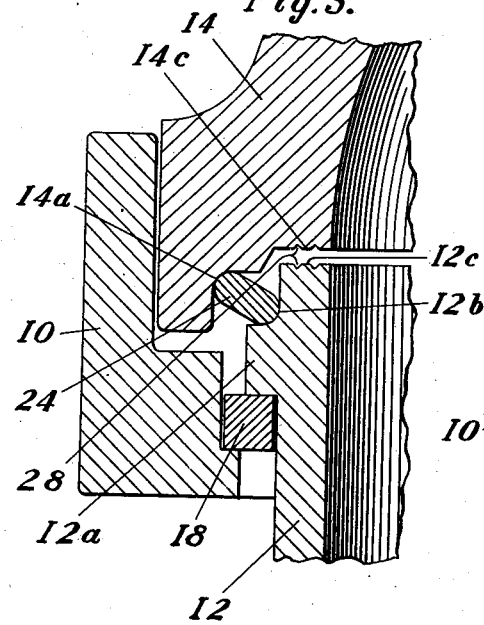 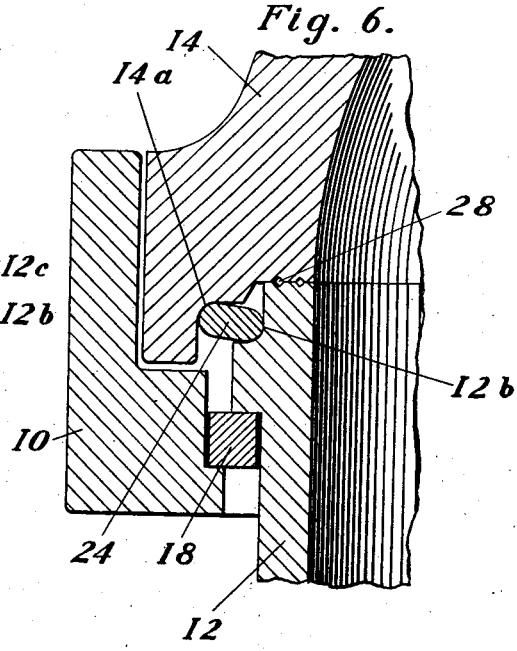
INVENTOR.
George T. Jacocks
BY Nathaniel Ely
ATTORNEY May 28, 1940.  G. T. JACOCKS  2,202,491

RETURN BEND

Filed Oct. 9, 1937   3 Sheets-Sheet 3

INVENTOR.
George T. Jacocks
BY Nathaniel Ely
ATTORNEY

Patented May 28, 1940

2,202,491

UNITED STATES PATENT OFFICE 2,202,491

RETURN BEND

George T. Jacocks, Larchmont, N. Y., assignor to The Lummus Company, New York, N. Y., a corporation of Delaware Application October 9, 1937, Serial No. 168,139

8 Claims. (Cl. 285—20)

This invention relates to return bends for tubular elements and is more particularly adapted for interconnecting tubes in high pressure and high temperature fluid service as in heat exchange relation for oil cracking and other processes.

One of the particular objects of this invention is to provide a return bend, having an abutting pressure-tight relation with the tubes and having a constant cross sectional area between the tube contacting surfaces, the sealing of the parts being removed from the abutting surfaces to maintain the uniform internal cross section of the return bend and tubes and for protection of the sealing device and to prevent erosion.

Another object of the invention is to provide an improved form of sealing gasket for a return bend which is sealed with respect to the tubes with an increasing tightness of the gasket as the return bend comes into contact with the tube abutment, the gasket tension exceeding the total tension between the return bend and the tubes, and being independent thereof.

A still further object of the invention is to provide an improved connection between a tube sheet and a return bend in which the parts are held together by adjustable means in compression with a minimum of metal between the adjustable means and the gasket to reduce expansion and contraction of the parts under high temperature changes.

A more specific object of the invention is to provide a high pressure and high temperature return bend for interconnecting a plurality of tubes with a direct gasket relation with the tube walls, the tubes being provided with sleeves of alloy metal with which the gasket cooperates so that tube creep is reduced to a minimum and the seal is not reduced in efficiency.

Further objects and advantages of my invention will appear from the following description of preferred forms of embodiment thereof, taken in connection with the attached drawings illustrative thereof, and in which:

Fig. 4 is a top plan view of the return bend with parts broken away and shown in section;

Fig. 5 is a detailed cross section showing the relation of the parts in a partially assembled potion;

Fig. 6 is a view similar to Fig. 5 with the parts in an assembled position;

Figure 1:
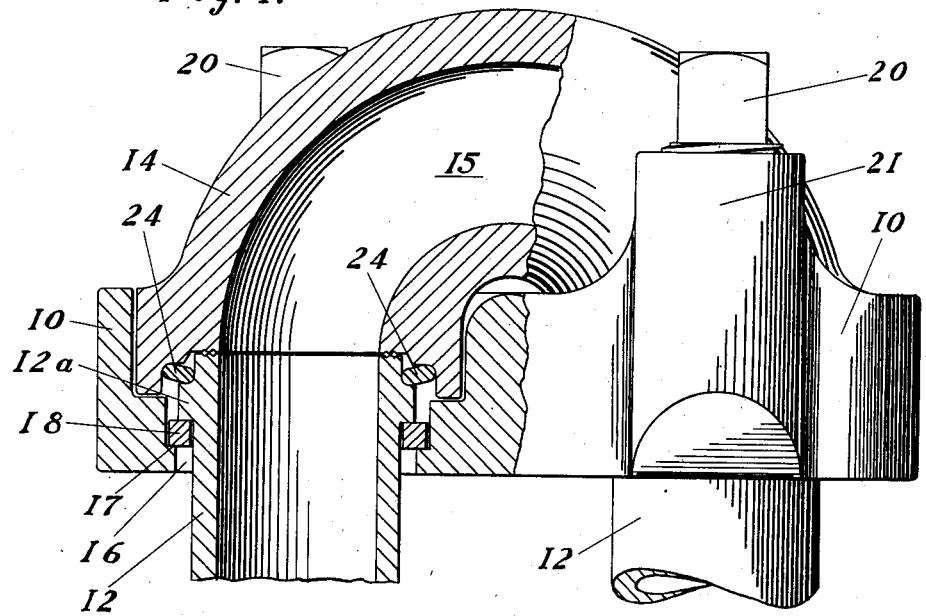
Fig. 1 is a side elevation of a return bend with parts broken away and shown in section.
Figure 2:
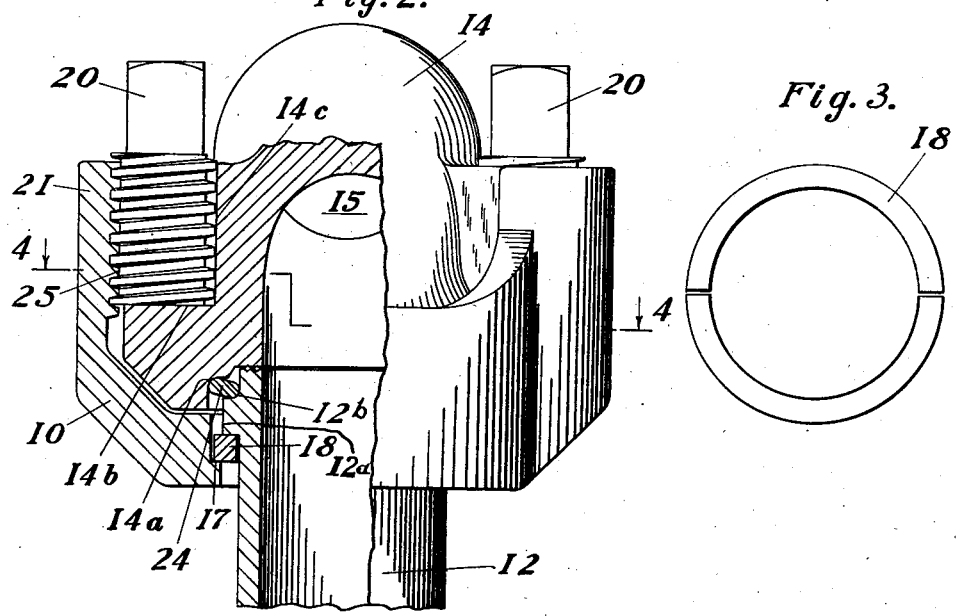
Fig. 2 is an end elevation of the return bend shown in Fig. 1 with parts cut away and shown in section.
Figure 3:
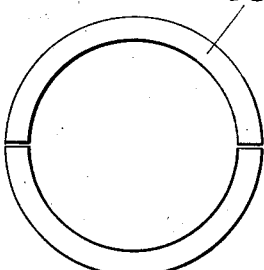
Fig. 3 is a plan view of an abutment ring for securing the tubes to the tube sheet.

In accordance with one preferred form of embodiment of my invention, the return bend assembly consists essentially of a tube sheet 10 to which the tubes 12 are attached, and the return bend 14 which has an internal channel 15 by which the tubes are rendered effectively continuous. In this form, the tube sheet 10 is provided with apertures 16 through which the tubes 12 extend, and shoulders 17 on the tube sheet 10 surrounding the apertures 16, support the split ring 18 which in turn supports the upset shoulders 12a of the tubes 12. Such construction permits a ready attachment and removal of the tube sheet 10 from the tubes 12 as the ring may be removed as desired. It is to be understood, however, that the tubes may be expanded in the tube sheet by the methods commonly used but as will hereinafter appear, such expansion is not necessary.

The return bend 14 is preferably secured to the tube sheet 10 by means of screws 20, the screw threads of which engage in the screw threaded parts of bosses 21 integrally formed as skirts or projections of the tube sheet 10 as will be apparent from the inspection of Fig. 4. This upstanding skirt or boss portion forms a recess into which the return bend 14 telescopically fits, the return bend having a smooth bore 14c to serve as the screw abutment, complementary to the screw threaded portion 25 on the tube sheet. The threaded screw portion 25 in the bosses 21 is approximately two-thirds of the diameter of the screw, which is found to be adequate. The bottom of the screws 20 engage a projecting foot or lug portion 14b on the return bend 14 and by using an enlarged contacting surface, a substantially reduced unit pressure on the screw is possible.

This form of screw is especially effective in heat transfer work for any tendency of the screw to expand under increases of temperature will tend to more securely seal the return bend to the tubes due to its compression action. It is to be noted, however, that the screws are spaced a substantial distance from the internal channel 15, and thus away from the greatest heat. In addition the screw threaded portion of the screw is in engagement with the threaded portion 25 of the tube sheet, and as such portion is externally exposed, the screw has a relatively slight temperature change.

The tubes are sealed with respect to the return bend 14 in one preferred manner by a ring form of gasket 24, which is normally in the shape of an inverted frustrum of a cone. To accommodate this gasket, both the return bend 14 and the ends of the tubes 12 are provided with shoulder portions shown in Fig. 5. The shoulder 14a on the return bend 14 has a rounded fillet with which one end of the gasket 24 contacts and the tube above the upset portion 12a has a shoulder 12b with which the other end of the gasket contacts. The angular contact which the gasket makes with respect to the line of force applied by the screws 20, is preferably of a low order and may be of the range of twenty to forty degrees with respect to a normal to this force. On application of the return bend this angle will be reduced the desired amount so that the change of angle will cause a sealing pressure on the respective shoulders.

The action is in the form of a toggle with the result that the seal is increased in effect throughout the angular change thus permitting an abutment of the return bend 14 against the ends of the tube 12 with the surfaces 12c and 14c of the respective elements in contact as shown in Fig. 5. It will be appreciated that the extent of the sealing pressure will depend on the angular change of the gasket and not on the relative movement of the return bend with respect to the tube sheet or the pressure required to force the parts together. If the angle is initially great, the movement will cause a substantial seal as the change is the difference between the sine of the final angle and the sine of the initial angle.

If desired the abutting surfaces 12c and 14c may be provided with shallow grooves 26, which will normally carbonize if high pressure hydrocarbons are conducted through the return bend and tubes. The gasket is spaced from the fluid path eliminating any erosion or corrosion and, as the internal channel 15 in the return bend 14 is of the same cross sectional diameter as the diameter of the tubes, there is no change of cross section in area or shape at any point in the fluid path. The interior of the return bend is truly streamlined and continuous between the surfaces abutting the tube ends and is thus free of eddy forming causes.

The gasket 24 may be made of any suitable metal, but it is preferably softer than the tubes or return bend, and it has such elasticity that even after long service it will tend to return to its initial shape. It may be reused as it is readily reformed to its initial condition. Its elasticity facilitates removing the return bend as it tends to open the joint when the screws are removed.

It is of course to be understood that other forms of gaskets can be used in lieu of the toggle form of gasket shown, and it is also obvious that other forms of securing means can be used in lieu of the compression screws. More effective heat transfer is accomplished by uniformity of cross section and absolute tightness of the joints, however, and these objects are more effectively accomplished by the particular toggle form of gasket which has a sealing pressure in excess of the longitudinal pressure holding the return bend to the tube sheet and the compression type of screws which retain the seal regardless of temperature change.

The amount of metal in the lugs 14b is conveniently of minimum thickness with the compression screws 20 and with the distance between the gasket 24 and the bottom of screw 20 low, there is very little metal to change under temperature variations. With repeated heating and cooling, there is no tendency to overstress the metal or develop leaks. These lugs 14b and the bosses 21, also facilitate stacking of the tubes as staggered constructions are possible.

Figure 7:
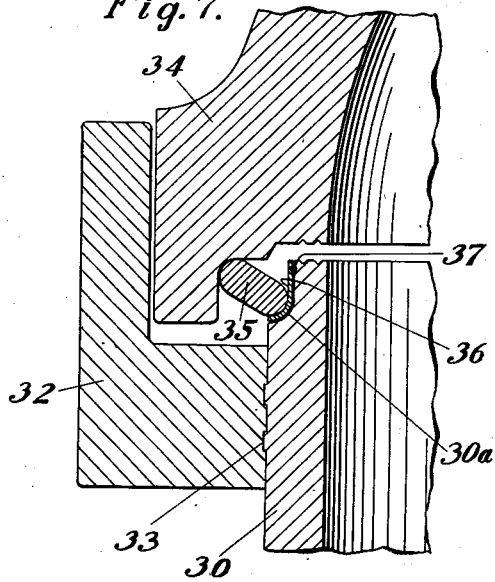
Figs. 7 and 8 are detailed cross sectional views similar to Fig. 5 but showing a modified form of construction in the partially assembled and fully assembled positions respectively.
Figure 8:
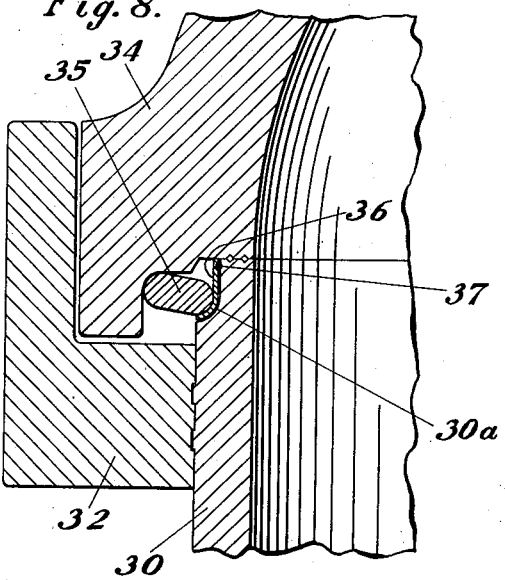

A modified form of construction is shown in Fig. 7 and Fig. 8, with the tubes 30 expanded into the tube sheet 32 as shown at 33.

As in the prior construction, the tubes 30 are sealed directly to the return bend 34 by the gasket 35 and the return bend as well as the tube ends is provided with shoulders for this purpose. It may be desirable, however, to use a collar or sleeve 36, on the shoulder 30a on the tube and such collar or sleeve may be of a suitable alloy, as for example, one containing 4–6% of chromium and ½% of molybdenum, which will prevent creep of the tube under high temperature and the pressure of the gasket. It is preferable that the sleeve or collar 36 be welded at 37 to the tube to retain it in place, but it is usually of such thin metal that it will be sealed by gasket pressure against the tube itself.

Figure 9:
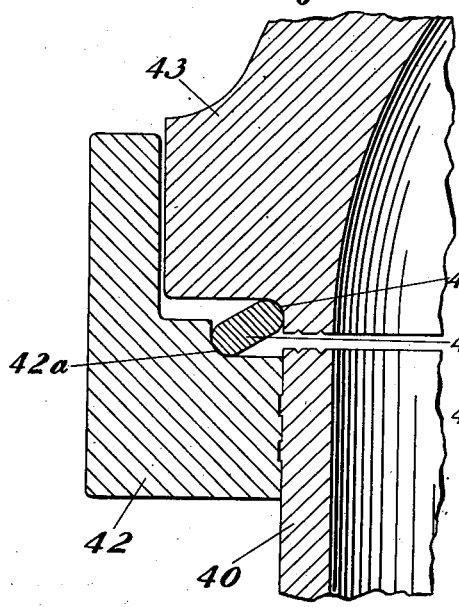
Figs. 9 and 10 are detailed cross sectional views similar to Fig. 5 showing a still further modified form of construction with the parts in a partially assembled and fully assembled position respectively.
Figure 10:
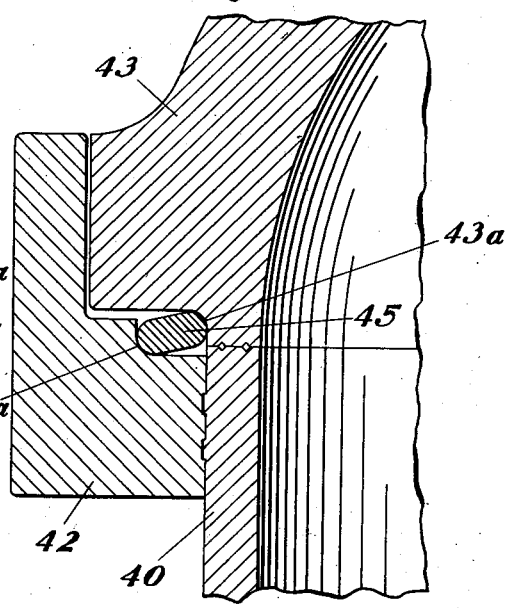

In Figs. 9 and 10, the tubes 40 are also expanded into the tube sheet 42 but in this construction the return bend 43 is sealed with respect to the tube sheet 42 rather than directly with the tubes as in the prior construction. Shoulders 42a in the tube sheet and 43a in the return bend 43 provide the diametrically opposite contact portions for the gasket 45. Application of longitudinal pressure between the return bend and tube sheet will cause a partial rotation of the gasket on an axis normal to a transverse plane through the gasket so that the lateral force at the diametrically opposite edges is increased to maintain the desired seal, and as the seal increases as the parts are brought together, the tubes and return bend can be brought into abutting relation to prevent any change of cross section from tube to tube and the tubes may be of uniform diameter throughout.

In these several forms of embodiment of the invention, it is desirable that the edges of the gasket be rounded and that the shoulders with which the gasket edges contact also be rounded, and to the same radius. The angular change of the gasket is thus of a rolling nature, and not only facilitates the closing together of the parts, but maintains an effective seal irrespective of the angular position. Furthermore, the entire arc of contact assists in sealing under high pressures.

While I have shown preferred forms of embodiment of my invention, I am aware that other modifications may be made thereto, and I therefore desire a broad interpretation of my invention within the scope and spirit of the description herein, and of the claims appended hereinafter.

I claim:

1. A return bend including a tube sheet into which a tube extends, a U member having a wing telescopically projecting into the tube sheet, and compression screws in screw threaded engagement with the tube sheet, and in abutting contact with the sides and the wing of the U member to hold said members together.

2. In a return bend of the class described, a tube sheet, a U member, said U member having projecting wing portions, said tube sheet having a screw threaded portion adjacent to the projecting wing portions on said U member, and screw means normally in compression and in threaded engagement with said tube sheet, and tubes in abutting relation with said cover, said extending wing portions on the U member being of relatively large surface area to accommodate large cross section screw means whereby unit stresses in the screw means are reduced.

3. In a return bend of the class described, a tube sheet having a U member, said U member having projecting portions, said tube sheet having a screw threaded portion adjacent to the projecting portions on said U member, and screw means normally in compression in threaded engagement with said tube sheet and in abutting relation with the projecting portions in said U member, said U member having a partially cylindrical smooth bore surface serving as an abutment for the compression screw means.

4. A return bend including a tube sheet having an outwardly projecting portion partially cylindrical in cross section and being screw threaded, a U member fitting within said outwardly projecting portion, and having a partially cylindrical smooth bore portion adjacent said screw threaded portion, and compression screws in screw threaded relation with the tube sheet and in abutting contact with the smooth bore portion of the U member, said U member having a projecting lug portion in abutting contact with the bottom of the screws.

5. A return bend including a tube sheet having an outwardly projecting portion partially cylindrical in cross section and being screw threaded, a U member fitting within said outwardly projecting portion, and having a partially cylindrical smooth bore portion adjacent said screw threaded portion, and compression screws in screw threaded relation with the tube sheet and in abutting contact with the U member, said U member having a projecting wing portion in abutting contact with the bottom of the screw, said tube sheet having a tube therein, and a gasket between said U member and said tube.

6. A return bend having a tube sheet into which tubes extend, a U member to interconnect said tubes, a gasket between said U member and each of said tubes, said U member having a projecting wing portion extending above the gasket, substantially the thickness of the U member wall, said tube sheet extending above said wing portion, and a compression screw engaging the side of said U member and in abutting relation with said wing portion.

7. A return bend of the class described, including a U member adapted to interconnect a plurality of tubes, said U member having surfaces abutting said tubes, gasket means spaced from the abutting surfaces to seal said tubes with respect to said U member, and means to secure said tubes to said U member including a tube sheet anchored to said tubes and detachable means to secure said tube sheet to said U member, said U member having relatively low wing portions projecting from the sides thereof, the detachable means abutting said wing portions substantially below the top of said U member.

8. A return bend to interconnect a plurality of tubular members, said return bend having wing portions projecting from the sides thereof closely adjacent to the tubular members, a tube sheet member engaging said tubular members and projecting above said wing portions and being provided with a screw thread surface less than 360° in extent, said return bend having a smooth bore opposite said screw threaded portion and securing means screw threaded in said tube sheet and held in said screw threaded position by abutment against the smooth bore of said return bend.

GEORGE T. JACOCKS.